United States Patent [19]
Graybill

[11] 3,789,582
[45] Feb. 5, 1974

[54] AIR RECTIFIER APPARATUS WITH PROCESS

[76] Inventor: Paul J. Graybill, 61 Sunset Hill Dr., Pine Orchard, Conn. 06405

[22] Filed: Apr. 21, 1971

[21] Appl. No.: 135,847

[52] U.S. Cl............................ 55/92, 55/97, 55/236, 55/239, 55/248, 55/260, 55/419, 55/461, 55/464, 261/79 A
[51] Int. Cl............................................ B01d 45/12
[58] Field of Search......................... 55/90–92, 236, 55/239, 244, 248, 260, 319, 337, 419, 440, 445, 446, 459, 461, 464, 482; 210/49, 4, 304; 261/79 A

[56] References Cited
UNITED STATES PATENTS

| | | | |
|---|---|---|---|
| 1,071,893 | 9/1913 | Doherty | 55/92 |
| 1,729,135 | 9/1929 | Slauson | 210/494 |
| 2,019,186 | 10/1935 | Kaiser | 55/278 |
| 2,465,430 | 3/1949 | Burke | 55/444 |
| 3,397,514 | 8/1968 | Rothfeld | 55/247 |
| 3,400,516 | 9/1968 | De Leon | 55/253 |
| 3,450,264 | 6/1969 | Graybill | 210/304 |
| 3,529,719 | 9/1970 | Graybill | 210/512 |

FOREIGN PATENTS OR APPLICATIONS

| | | | |
|---|---|---|---|
| 601,178 | 4/1926 | France | 55/446 |
| 264,896 | 1/1927 | Great Britain | 55/440 |

*Primary Examiner*—Bernard Nozick

[57] ABSTRACT

This application discloses a permanent Air Rectifier with Process which centrifugally separates coarse contaminants through escape ports with some air from a pressured air flow passing through at least one confined narrow curved channel having windward vertical sidewall baffles therein.

This cleaner air being then radically reversed, inertially dislodging additional particles, before passing through enclosed narrow oil soaked corrugated walled channels where extreme turbulance removes finer contaminants by contact cohesion or electrostatic attraction to said corrugated walls, which walls are capillarily oil soaked from an oil filled porous sump, said air being again reversed into a turbulance chamber completing the process.

9 Claims, 7 Drawing Figures

PATENTED FEB 5 1974

CARBURETOR THROAT

INVENTOR.
Paul J. Graybill

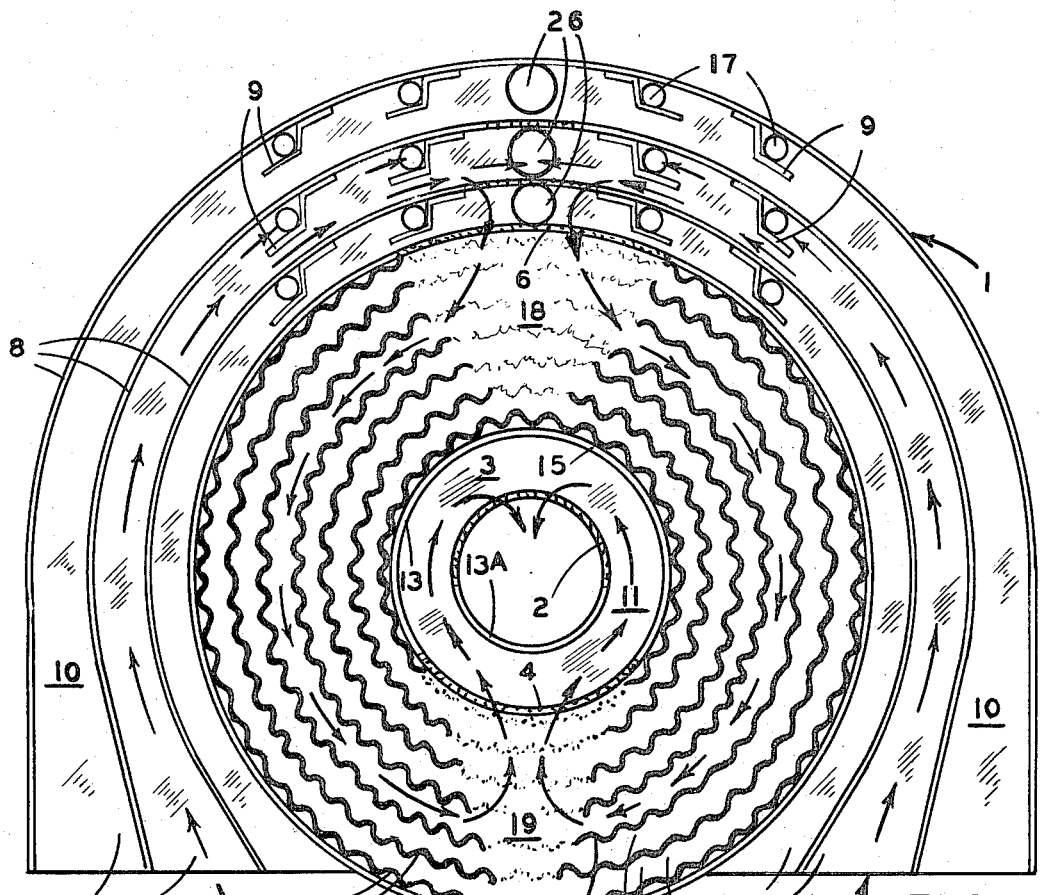
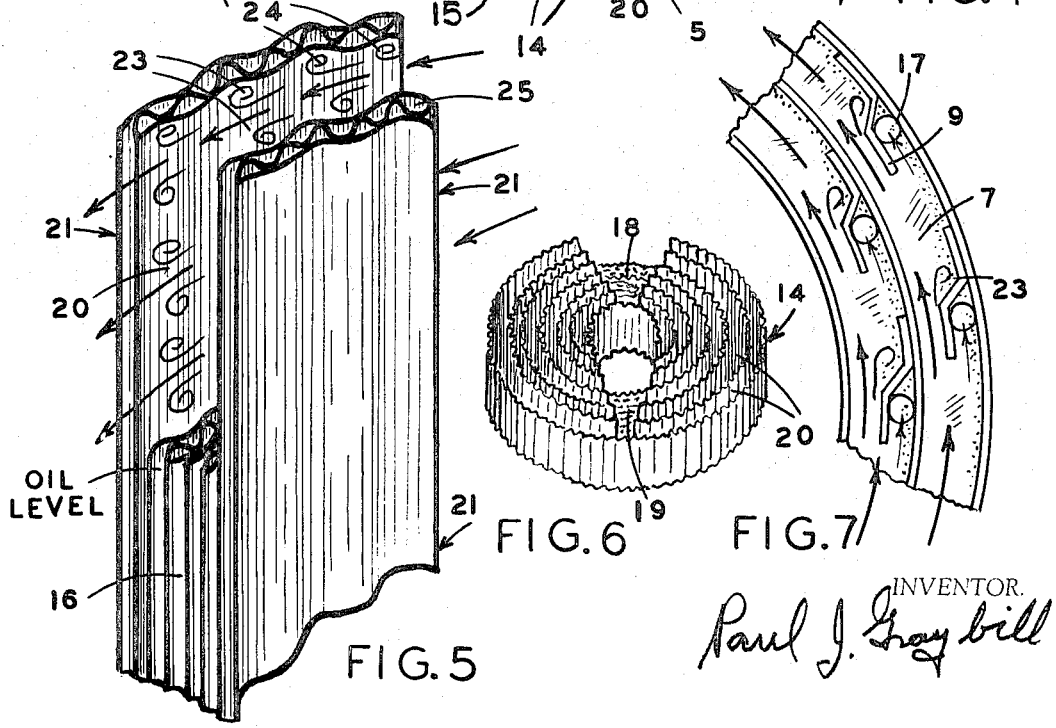

AIR RECTIFIER APPARATUS WITH PROCESS

BACKGROUND OF THE INVENTION

The removal of both micronic and sub-micronic contaminants, both wet and dry, from the air intake has always been a major problem in industry and transportation, and is perhaps the most disastrous single factor in motor maintenance as well as the maintenance of compressors and other oil or air using equipment. We are here, however, chiefly concerned with air cleaners for internal combustion motors, even though the same process and apparatus with variations may serve other type operations equally well.

A great number of devices have been developed and used in an attempt to solve this urgent problem, but none have been highly successful as regards long life and efficiency under all conditions, together with assurance against catastrophic failure and/or high initial installation, maintenance, and labor costs.

These air cleaners have been essentially of two types: (1) the wet or oil bath type, and the other (2), the dry porous paper element type. Some applications have employed combinations of several variations of those two types in multiple phase units.

The Oil Bath Type has employed either fibre or metal mesh elements superimposed above the oil bath chamber through which mesh the air must flow upwardly. The mesh is kept oiled by the upward suction of the oil from the chamber below by the air flow. This, then, constitutes a two phase cleaning action. The first phase is accomplished by an abrupt reversal of the air stream at the surface of the oil to purge, by inertia, any large contaminants, including water, these being forced out of the air downwardly into the oil as the air is making its abrupt turn. The second phase is the passage of the air upwardly through the oil soaked mesh which by small patterns of reverse flow, centrifugal action, eddying and plain surface contact, even the very fine contaminants are cohered to the oil on the mesh, where they are held and may be at least partially drained back into the oil chamber of the unit by the dripping oil. Tests have shown that in ideal conditions, where idling is not too excessive, these units may remove as much as 90 percent of all abrasives above 10 microns in size and 98 percent of all contaminants irrespective of size. This of course is not ideally sufficient both as to the amount and size of the contaminants since it is the 5 to 10 and larger micron silica particles which most effectively destroy equipment and motors. Some authorities state that 258 grams of such contaminants will effectively destroy a motor regardless of when or at what rate they are ingested, hence the importance of removing essentially all of such contaminants. However, the oil bath cleaner is certainly a great step forward in keeping air free of these contaminants if it were possible to overcome certain intrinsic disadvantages and faults therein.

Some disadvantages of the Oil Bath Cleaner are: (1) the necessity of keeping the oil at the proper level in the oil chamber since in the case of too much oil some is drawn into the motor with considerable contaminants therein, and on the other hand if there is too little oil the mesh dries out completely, hence little cleaning occurs, (2) the problem of snow, rain, or other water entering the chamber as it is removed from the air stream and raising the oil level thus again causing the oil to be drawn completely out into the motor, dirt and all, as stated above with bad effects on the motor and also completely limiting the effectiveness of the unit, (3) the necessity of complicated maintenance programs, frequent inspection to maintain oil level, regular removal and cleaning of the mesh and cleaning of the oil chamber and replacing the oil, (4) also the efficiency of the unit drops drastically during idling due to lack of inertial force in purging contaminants and/or picking up oil to be carried into the mesh, which without this oil then becomes dry and ineffective, and (5) in extremely large motors wet cleaners are cumbersome to install and handle.

Some of the specific advantages of the Oil Bath Filter are: (1) generally speaking, they are smaller and can be positioned under the hood of a vehicle except as stated in extremely large motors, (2) they are relatively inexpensive to maintain, the oil is readily available and it is cheap and the mesh need not be replaced, only cleaned, (3) there is no continuous porous filter medium to replace, clean, or to rupture and thereby pass dirt, (4) wet cleaners do not markedly change the fuel-air ratio by becoming clogged, which is important in the prevention of carbon and pollutants and the maintenance of good mileage and clean exhaust and (5) they do not require an inventory or filter elements to be kept on the shelf for replacement.

DRY TYPE FILTERS

Dry filters have been used in a large variety of configurations and multiple arrangements with and without centrifugal, matt, or pleated paper precleaners. Paper element filters may be mounted in series, one within the other or in parallel. A matt element may be installed as a precleaner on the assumption that it will catch a greater percent of the fine particles and allow the passage of the larger particles since the fine particles stop up the porosity of the regular paper elements faster than the larger particles which instead pile up on the paper element and allow the air to flow through more readily than do fine particles. When centrifugal precleaners are used as much as 90 percent of the large contaminants are eliminated before going into the pleated paper element or elements, however the fine particles consequently are still present to plug the fine porosity of the paper element. It should be noted that some manufacturers of paper elements are oiling said elements, which of course will attract and hold contaminants more readily but will also become clogged more easily than the regular resin treated paper, it can be claimed however, that as far as cleaning is concerned the oil adds to the performance. Some dry filters have dust cups to catch any dislodged contaminants, these to be manually removed, and some have dirt extractors articulated to the exhaust of the motor to dispose of any accumulated contaminants, also some as stated have moisture eliminators, as well as these dust precipitators mounted in front of the pleated paper elements in an attempt to preclean the air and/or remove water or snow.

Under ideal conditions dry filters are even more efficient than oil bath cleaners and may remove as much as 99 percent or more of all contaminants above 5 microns in size, which of course is a great advantage since contaminants below the 5 micron level are not generally abrasive, hence dry filters are preferred for this reason by some users even though they have serious shortcomings as will be indicated in the following.

Some disadvantages of the Dry Filters are as follows: (1) replacement or cleaning of the porous element with its inventory cost and labor which cleaning involves, also the ever present problem of breakage of the element, therefore great care must be taken. Also the loss of efficiency of the element is a problem and has to be considered since perfect cleaning is impossible, and even slight contamination of the element restricts the air flow to the motor changing the air-fuel ratio and causing imperfect combustion. Indicators are sometimes used to indicate this pressure differential in an attempt to control this disastrous fault, (2) water, snow, or extreme moisture decreases the efficiency of the paper element and may even cause mud or ice to form and completely stop the air flow, thus completely stopping the motor, (3) ordinary fatigue from engine vibration may cause a paper element to fracture with disastrous results to the motor, and (4) dry filters are quickly clogged by exhaust contaminants, smoke, and especially by oil. In fact where oil is present, dry filters cannot be used effectively.

Some special advantages of dry filters are as follows: (1) dry type filters may generally be mounted in any position while wet filters must be mounted vertically, (2) a restriction gauge may be mounted in the cab to assist in determining service intervals, (3) additional stages and precleaners may be added as stated to meet extreme needs.

With the foregoing in mind it can be readily seen that much needs to be accomplished in air cleaners to overcome the shortcomings of those in use both wet and dry. The greatest faults might be said to be, (1) restriction of the air and change in the air-fuel ratio when the element is even partially clogged, which ratio must be kept constant under all and every circumstance if proper motor performance is maintained, (2) the loss of efficiency by water, mud, or ice in extreme conditions is also very serious, and (3) the fracturing of the element while cleaning or from fatigue when not detected is disastrous.

It should be pointed out that cleaning the intake air is of the utmost importance since some of the abrasive contaminants that are present in the air intake when drawn into the combustion chamber where ignition takes place, are blasted like bullets into the oil on the side walls of the combustion chamber and are there held in the oil in the upper part of the cylinder wall to do their destructive work in wearing the pistons, rings, and cylinder walls, especially if they are above 5 microns in size, as they are violently rubbed up and down by the piston before they finally work downward past the rings into the oil in the crankcase where they can then be removed by filtering the crankcase oil. However, at that point they have already done most of their damage. It should be also realized that particles of silica are the most difficult contaminants to remove when present in the crankcase oil, they do not ionize easily and are not electrostatically attractable to be removed by electrostatic attraction, and because of their light specific gravity they do not settle readily. Hence, they should by all means be removed from the air before entering the combustion chamber. In addition it should be noted that currently used oil filters which have absolute ratings of as high as 20 to 40 microns will not effectively remove these contaminants from the crankcase oil and they remain in the oil to be recirculated time after time until they are ground up by the motor, and it is these contaminants that effectively destroy a motor, thus the importance of a proper Air Rectifier to reduce this hazard.

In view of the above facts it would seem that an air cleaner based on either a wet bath or on porosity as are the present cleaners, are to these extents, inadequate and that an apparatus and process that would correct these shortcomings would do exactly what these cleaners fail to do and would not function as they do. In fact, present cleaners perform exactly contrary to the way an ideal Air Rectifier would perform in most respects. A proper Air Rectifier would not have a porous element, thus eliminating natural clogging or extreme clogging by rain, snow, or mud; it would eliminate the problem of fracturing the element, also the expense of element changing. It would avoid the problem of catastrophic failure as in Oil Bath Cleaners when too much or too little oil is in the oil chamber.

It should be noted here that clogging is very disastrous. A clogged paper filter results in the use of more fuel, the creation of additional carbon, the contamination of the spark plugs, the corrosion and sticking of valves, the contamination of crankcase oil, increased motor wear, and it also adds pollution to the exhaust. Hence this problem must be solved. An Air Rectifier must not clog.

SUMMARY OF THE INVENTION

In consideration of the above factors the instant Air Rectifier with Process was developed over a period of years employing any and all usable physical principles and functions which could clean air effectively and at the same time obviate the shortcomings of current filters both dry and wet, employing such physical laws as centrifugal and inertial forces, aerodynamic-turbulance, eddying, pressure purging, surface cohesion, electrostatic attraction, capillary and gravitational pull with liquid bonding.

The Air Rectifier as herein disclosed consists of a unitary, essentially circular structure of sheet metal or the like, having a removable lid, a solid one piece bottom and at least four structural sections fully structured therebetween: (1) the outermost section consisting of a multiple number of parallel and enclosed narrow, open ended, and curved intake channels on each lateral and the rear sides of said Rectifier, said channels having at least one each, on its windward side, a side-wall baffle with an escape port positioned in the floor of said channel behind said baffle, (2) a circular doughnut shaped element chamber, with the liquid tight lower section forming an oil sump, this chamber positioned immediately inwardly from and having port connections to said inlet channels, about which chamber said intake channels are curved, said element chamber being fully filled by having therein an element of absorbent material such as corrugated paperboard or the like, said element consisting of a multiple number of concentric full height strips of corrugated paperboard being separated at the bottom portion by fully concentric sections of honeycomb-like materials, this filled with oil thus forming at the upper portion of said strips a number of narrow channels, with corrugated walls, said concentric walls having cut-outs therethrough at opposite sides thereof to facilitate the flow of air into and out of said channels, (3) a circular liquid tight turbulance chamber immediately inwardly from said element chamber and having port connections therewith, and finally (4) within said turbulence chamber a central outlet port, having a circular flange articulated thereabout said flange extending downward from the floor of said turbulance chamber to facilitate articulation to the motor intake port, said flange also extending upwardly to the full height of said chamber on the windward side of said flange and only part way up on the leeward side thereof to form on one side a baffle about which the moving air must flow on both sides thereof, and on the leeward side a port into which the air must flow to enter the outlet port to the motor.

The actual operation of the unit is as follows: Air being activated by the fan and the forward motion of the vehicle as well as by the vacuum of the motor intake, is drawn and blown through the four phases of the Air Rectifier at terrific speeds, enters the open forward ends of the outer air intake channels which total flow capacities are far in excess of that later needed for the motor. The air is therefore under constant pressure, the Rectifier being then a moderate super charger, forcing the air backward through the curved intake channels at terrific speed which by centrifugal force dislodges and evacuates essentially all heavy contaminants through said escape ports behind said windward side-wall baffles in said channels. The remaining cleaner air flowing from these intake channels is abruptly reversed at the back of the unit as the opposing flows from each side of the unit converge head-on in abrupt reversal to enter the second inward section of the unit at this point dislodging contaminants and purging them through additional centrally positioned escape ports. The air then enters the element chamber which contains the element having narrow oiled, corrugated walled channels through which channels, with great turbulence, the air flows in close relationship and at great speed, where sub-micronic and micronic contaminants are surfaced cohered by contact or are electrostatically attracted to said oil on said walls. These contaminants are there held in loose relationship being subject to settling downwardly into a lower honeycomb oil filled sump from which the oil by capillary attraction keeps the corrugated channel walls saturated at all times.

Again, after flowing through said oil saturated channels, the air is abruptly reversed backwardly into the turbulence chamber where it is deflected by the outlet port flange and flows about said flange on each side thereof and again comes head-on in an abrupt turbulating reversal as it enters the motor intake port, any remaining heavy contaminants are there dislodged to the floor of the turbulance chamber and are there held by an oiled coating.

Thus centrifugal force with contaminant purging, abrupt reversal with inertial force, and also forced evacuation of contaminants, extreme turbulence within oiled corrugated channels where cohesion and electrostatic attraction are strongly promoted, and again abrupt reversal with inertial force and great aerodynamic turbulence in a turbulance chamber successfully remove both heavy and sub-micronic contaminants without a porous filter medium and without any reduction or change in the air-fuel ratio and with little or no service except the occasional addition of oil to the sump of the Rectifier and perhaps a 100,000 mile or yearly solvent cleaning of the corrugated element which may be desirable if not necessary since the honeycomb sump has a tremendous dirt holding capacity.

These and other advantages will be better understood when reference is made to the following drawings and descriptions.

BRIEF DESCRIPTION OF THE DRAWINGS

Here in simple disclosure is presented a number of drawings which illustrate one possible formulation of the Air Rectifier, its Apparatus and Process, FIG. 4 is a top view of the open Rectifier showing the oiled element in position in the element chamber. Also shown are the side-wall baffles with escape ports within the inlet channels, FIG. 5 is an enlarged detail of the oiled element showing a narrow corrugated walled channel, the air turbulance pattern, and the honeycomb and oil filled sump portion as well as the detail of the corrugated paper construction of the corrugated walls, FIG. 6 is a miniature schematic perspective view of the oiled element showing the narrow oiled corrugated walled channels and the entrance and exit cutaway areas in said corrugated walls, FIG. 7 is a top view of a portion of the outer curved inlet channels with windward baffles and the associated escape ports in the floor thereof.

DETAILED DESCRIPTION OF THE AIR RECTIFIER, APPARATUS AND PROCESS

Figure 1:
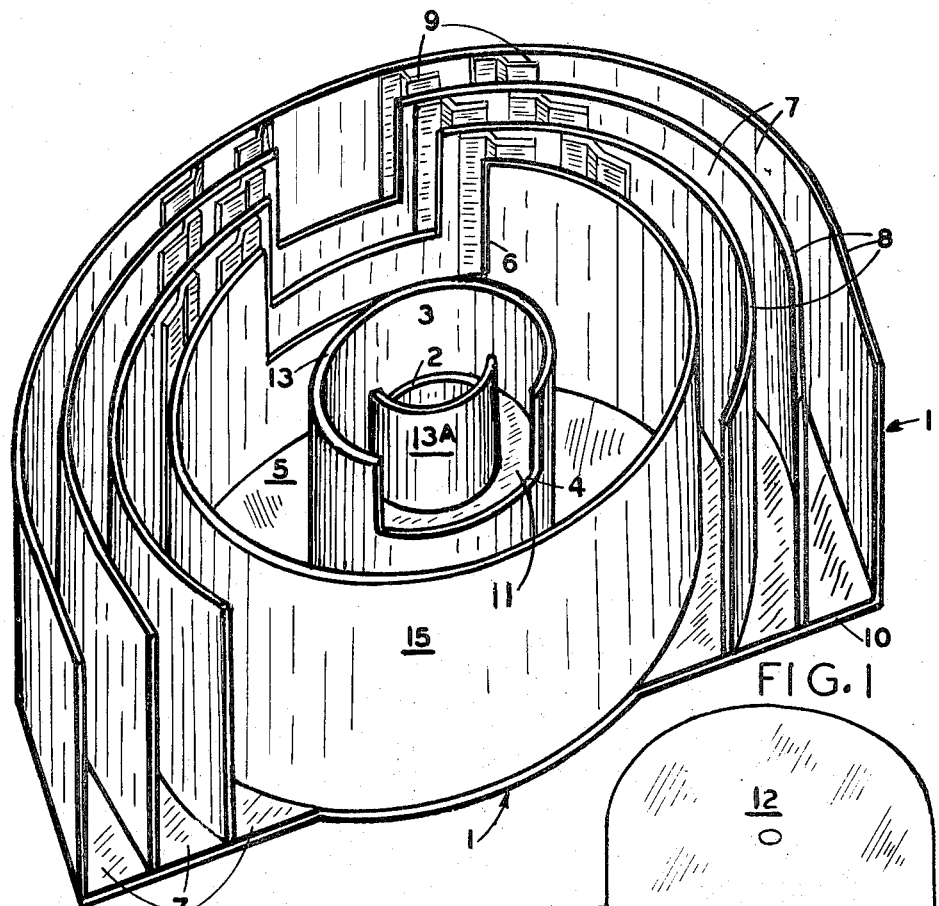
FIG. 1 is a perspective view of the metal body structure of the apparatus without the lid in place showing the intake channels with baffles and escape ports, these intake channels for the air intake are positioned on each extreme side thereof. Also shown is the corrugated channel element chamber immediately therein, and still farther inward is shown the turbulance chamber and the outlet port, the outlet port flange and the outlet port flange baffle.

Referring then to the drawings in FIG. 1 is shown the metal body structure of the apparatus (1), with the outlet port flange (2), the outlet flange baffle (13A), the turbulance chamber (3), the turbulance chamber outer wall (13), the turbulance chamber inlet port (4), the encompassing narrow corrugated channel chamber (5), with outer wall (15), the narrow corrugated channel chamber inlet port (6), the curved outer intake channels (7), with side walls (8), the wall baffles (9), the apparatus floor (10), and the turbulance chamber floor (11).

Figure 2:
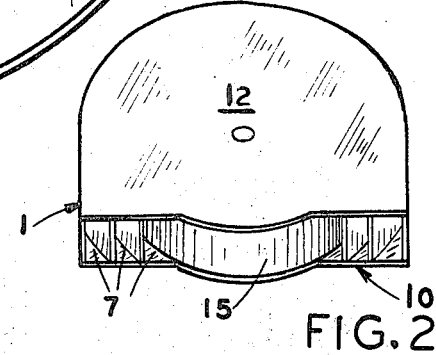
FIG. 2 is a miniature angular front view of the Air Rectifier with lid in place.

In FIG. 2 is shown the lid (12) in position on the body structure (1).

Figure 3:
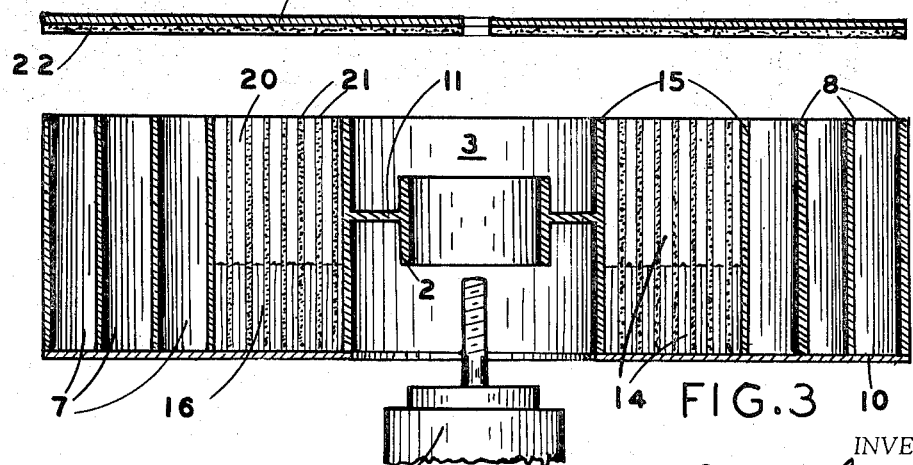
FIG. 3 is a frontal medial cross-sectional view of the Air Rectifier with the lid elevated and the carburetor throat positioned below the outlet port flange. Also shown is the cross-section of the element with corrugated attractor walls and the honeycomb structure positioned in the element chamber.

In FIG. 3 is shown lid (12) in elevated position with corrugated porous gasket (22), also shown is the carburetor throat positioned below the carburetor outlet port (2). Also shown in cross-section is the narrow corrugated walled attractor element (14), with the oil filled honeycomb (16).

In FIG. 4 is shown more positively the wall baffles (9) with escape ports (17), also shown are inlet cutaway passage (18) in corrugated walled element (14), and outlet cutaway passage (19), also in said element (14), also shown are corrugated channels (20) and oiled corrugated walls (21) of element (14), as well as central escape ports (26).

In FIG. 5 are shown oil filled honeycomb (16), corrugated walls (21), corrugated channels (20) and air flow patterns (23) with side swirls (24), also is shown the detail of the corrugated paper walls (25).

In FIG. 6 is shown in miniature the oiled corrugated walled channel element (14), with channels (20), inlet cutaway (18), and outlet cutaway passage (19), (element (14) may be encased in thin metal or the like leaving passage ways (18) and (19) uncovered also leaving a small hole for adding new oil.) (This covering not shown.)

In FIG. 7 is shown a detail of the outer intake channels (7), with baffles (9), escape ports (17), and air flow pattern (23).

DESCRIPTION OF THE OPERATION AND METHOD

Observing FIG. 4 it can be seen that an abundance of contaminated air, perhaps 100 percent more than is finally needed, enters outer channel (7) under the impetus of the motor fan and the forward speed of the vehicle, this air being under constant pressure and maximum speed at all times, perhaps flowing at the rate of 50 to 100 miles per hour, hence as it flows about curved inlet channels (7) all heavy contaminants including water and snow will move outward to the outer side walls (8) where they will move along said walls and enter back of wall baffles (9) and will then be blown out of escape port (17) with a small amount of the air flow. (See FIG. 7.)

The remaining cleaner air from the multiple inlet channels from both sides of the unit will converge head on with great turbulance and inertial force as it turns at the end of the channel expelling additional heavy contaminants outward through central escape ports (26), and then will make a radical reverse turn to pass through inlet port (6) and into cutaway passage (18) to enter narrow corrugated channels (20), where it will travel forward at great speed and aerodynamic turbulance as it is whipped about by the corrugated side walls. As is shown in FIG. 5 the air flow pattern (23) creates side swirls (24) thus during the complete travel through the narrow channels all parts of the air is brought into close proximity to the oiled walls (21) always with an outward centrifugal movement and eddying in these corrugations which creates a situation in which essentially all micronic and sub-micronic contaminants are contact cohered or electrostatically attracted to these oiled walls of the narrow corrugated channels where they are there held.

It is generally known that sub-micronic particles acquire an ionic charge of static electricity which then makes the particles attractable to material of opposite polarity, in this case to the oiled walls of the corrugated channels. This attraction can move contaminants of sub-micronic size as much as 1/64 to 1/32 of an inch or more as can be readily observed and measured as they pass in air near the oiled surfaces.

As noted previously, many contaminants are thrust against the oiled surface by inertial forces in the turbulance of the corrugated channels and essentially all of the remaining contaminants are in addition also electrostatically attracted thereto. Hence, the air is freed of the greater portion of all contaminants down to 2 microns and below in size. It should be noted that when a particle of dirt contacts the surface of oil it is tenaciously held and as these contaminants build up on the surface of the corrugated walls the oil film engulfs each new particle, forming a new oil surface and when sufficient amounts of this surface build-up occurs these particles tend to travel downward into the honeycomb where they remain. Thus the oiled walls are at least partially self-cleaning. It has been demonstrated that the capacity of the honeycomb in the instant unit is sufficient to contain contaminants up to 100,000 miles or more of normal driving. Hence, the unit may never have to be renewed or cleaned except as stated under certain abnormal conditions or at greater distances.

It should be noted also that the oil on the surface of the corrugated walls is automatically maintained in sufficient supply by capillary attraction from the oil filled honeycomb sump. Hence the only service required by the instant Air Rectifier under normal conditions is an occasional refiling of the honeycomb sump with oil. In severe conditions an occasional inspection of the element might indicate the element needs to be washed or replaced and the element chamber and sump be cleaned and refilled with oil.

These corrugated walls may be made of ordinary corrugated paperboard such as is used in corrugated containers, this assembled paperboard being corrugated on a longer pitch as shown in FIG. 5 to increase the size of the convolution. Although other materials may be used, the corrugated paper construction is especially advantageous since oil travels upward within the small corrugations indigenous to the corrugated paperboard and rises to the top as essentially clean oil without traveling through the contaminants on the outer surface. It then flows downward on the outer surfaces resulting in an extremely efficient operation thus helping to keep the outer surfaces of the corrugated channel walls essentially clean.

In one test of 100,000 miles on a 1968 Pontiac 400 no service was required by the Air Rectifier except four refills of one pint each of oil. At the end of the test no contaminants were found on the walls of the corrugated channels beyond 5 inches from the entrance end of the channel, which indicated extremely efficient operation. A test at that time of the crankcase oil showed nothing above 2 microns in size (a micron is 1/254,000ths of an inch), and only a negligible amount of sub-micronic silica which by being below 2 microns in size was absolutely harmless, that is, it was smaller than the oil film between the reciprocating parts of the motor and consequently could not cause abrasion and wear.

The air flowing from the ends of these opposing corrugated channels again comes head on from both sides in great turbulance and is reverse flowed into a turbulance chamber about the chamber outlet flange baffle again reversing as it enters the chamber outlet flange port. This action dislodges any possible remaining heavy contaminants to the oiled floor of the turbulance chamber before entering the motor.

Again after 100,000 miles the oil film on the floor of the turbulance chamber contained no noticeable contaminants indicating that they had been successfully removed by the preceding operations before arriving at the motor intake.

To recapitulate briefly, air under pressure from the motor fan and the forward movement of the vehicle, which air is traveling at great speed enters the inlet curved channels on opposing sides of the Air Rectifier where heavy contaminants including water and snow are forced outward to and along the outer walls of said channels, finally moving behind the side wall baffles where they are forced out of said channels with a small amount of the air through escape ports behind said baffles in the floor of said channels. The cleaner remaining air then collides head on with the air flowing from the opposing channels, thus setting up great turbulence with strong currents and eddies further dislodging heavy contaminants which are purged through the central ports in the floor of the Rectifier at the end of the intake channels as the air makes an abrupt turn creating strong inertial force and enters the oil soaked walled corrugated channel attractors in the Rectifier. The air traveling with great speed and turbulence with strong side eddies passes the corrugations in the narrow corrugated channels, causing essentially all minute particles to be cast against or electrostatically attracted to the oiled corrugated walls, where they are held out of the main air flow and finally moved by gravity on the oiled surface downward into the honeycomb oil filled sump of the Rectifier. As previously stated the side walls are constantly oiled by capillary attraction from the oil honeycomb sump. After passing through the corrugated channels on each side of the Rectifier the opposing air flows again collide head-on as they are radically reversed through an exit port into the turbulance chamber past the motor intake baffle where they finally are abruptly reversed into the motor intake thus eliminating any possible remaining contaminants by inertial force, casting them on the oil covered turbulance chamber floor where they cannot escape.

In the aforementioned 100,000 mile test run less dirt or water had entered the motor and subsequently the crankcase oil than has been true of any conventional filter tested, either wet or dry. Also on this test run there was no service necessary except the addition of four one-half pints of oil. No removal or replacement of parts was necessary as well as no cleaning of the element or oil sump. However, it is likely that in continued long runs or runs under severe conditions the narrow corrugated channe' element might need to be removed and cleaned or replaced and the channel chamber cleaned and the sump thereof refilled with oil. However, the inexpensive element made wholly of corrugated paperboard which is recorrugated on a longer pitch can be reused after cleaning if desired since no deterioration can take place and there is no porosity to clog. Hence the Air Rectifier is an air cleaning apparatus that cleans air by other principles than by porosity and actually outdoes porous filters. It employs some of the principles of the oil bath cleaner but operates more efficiently without the problems of frequent servicing or the problem of failure by becoming water filled and/or losing oil or allowing contaminated oil to be drawn into the motor. It also has the advantage of acting as a super charger without the defects of either a dry porous filter or an Oil Bath Filter which may clog and restrict the air flow sufficiently to alter the fuel-air ratio with its disastrous results. Mud, ice, or snow cannot restrict the element, and cannot enter the motor. Also the porous element cannot rupture since there is no porous element. The instant apparatus and process not only cleans air but by keeping the fuel-air ratio absolutely constant it allows very accurate carburetor or injector adjustments, resulting in better combustion and a substantial increase in motor mileage, which clean running, prevents carbon deposits in motors, on spark plugs, or valves thus increasing spark plug life, valve life, and decreases carbon in the oil, which in turn increases crankcase oil life and substantially decreases the amount of oil used, by both the prevention of the dilution of the oil by unburnt fuel caused by poor carburetion and injector adjustments as well as it prevents blow-by and the loss of oil thereby.

By test, spark plug life has been increased by 300 percent and the life of crankcase oil by even more. An increase in mileage over controls of 2.5 miles per gallon was noted in the 100,000 mile test. A combination of all of these factors resulted in a very substantial saving. A test of the motor compression on each cylinder after the 100,000 miles showed less than 2 lbs. deviation from a normal new motor which would indicate that under similar conditions this motor could run a second 100,000 miles as far as wear from air borne dirt is concerned.

Thus increased life of the motor with freedom from repair may be the most important result from the use of the instant Air Rectifier. The ultimate result then is a motor with long life with high efficiency and unnecessary wear, having good lubricating oil efficiency and a considerable overall saving in services, with no catastrophic failures as well as less pollution of the air, little or no discarding of parts and a general upgrading of ecology in all its aspects.

The features of the instant apparatus and processes are new, novel and useful and constitute a decided advance in the treatment of intake air in motors and other equipment. These features used in toto or in part or in various sizes and different arrangements or with altered parts serving the same purpose, are within the spirit of the invention. The embodiments shown do not limit the broad features of the apparatus and processes claimed, but are only exemplary and other embodiments including modified forms or the omission of some of these essential parts and processes may be resorted to without departing from the spirit of my invention or the scope of the sub-joined claims.

I claim:

1. An Air Rectifying Apparatus for the removal of both micronic and sub-micronic solid contaminants, such as dirt, mud, hail and snow, as well as liquid contaminants such as rain, oil and water from an air stream flowing therethrough, said apparatus comprising:

a unitary essentially circular body structure composed of rigid nonporous material such as sheet metal, having a removable lid, said unitary body structure also having a floor with upwardly positioned vertical wall structures solidly articulated thereon, said wall structures so positioned and deposed as to extend upwardly to the lid and form between said floor and said lid three distinct essentially concentric bottomly liquid tight operational divisions in said apparatus;

an outer division consisting of two crescent shaped intake channels, these being open on one end and joined on the other end and together being essentially horseshoe shaped and positioned on the two lateral sides and the rear of the next inner division of said apparatus, said channels having contaminant purging means therein;

an element chamber immediately inwardly from said intake channels, these having one wall in common, said common wall having a rear but upwardly positioned port therethrough to allow the passage of air from the intake channels into the said element chamber;

said element chamber being doughnut shaped and having a lower liquid tight sump portion and an inner wall in common with the third and innermost division, the turbulance chamber, said common wall having an upwardly and forwardly positioned port therethrough to allow the passage of air from the said element chamber to said turbulance chamber, said element chamber having an attractor element positioned therein;

said element so deposed and formed as to fully fill said chamber, having flow channels in the upper portion thereof thus to allow air to flow therethrough from said rear port and said intake channels on both sides through the doughnut shaped attractor element to the opposite port and therethrough into the turbulance chamber, the third and innermost division of said apparatus;

said turbulance chamber having a tubular outlet flange therein articulated about a port in the floor thereof;

said flange affording a tubular articulating means extending below said floor and also an upwardly extending portion between said floor and the lid of said apparatus in said turbulance chamber, said portion having an upwardly positioned port therethrough on the side opposite the inlet port joining the element chamber through which port the air may flow from the turbulance chamber into the outlet flange.

2. The apparatus of claim 1 in which said purging means in said crescent intake channels consist of one or more side-wall baffles articulated to the outer sidewalls and also escape ports in the floor of said channels at each side wall baffle so deployed as to allow the escape of a small amount of air containing the inertially dislodged contaminants.

3. The apparatus of claim 1 in which escape ports are positioned in the floor at the convergence of said intake channels so deployed as to purge dislodged contaminants with a small amount of air therefrom.

4. The apparatus of claim 1 in which said outer intake air channels are subdivided into two or more channels by bottomly articulated walls dividing said channels, thus forming a multiple number of narrow channels on each side of said apparatus, with each channel having said purging means therein.

5. The apparatus of claim 1 in which said tubular outlet flange is the full height of said turbulance chamber extending upwardly to the lid on one side thereof next to the inlet port and only part way upwardly on the opposite side thereof, thus so deposed as to force the air flow to pass thereabout said flange and make an abrupt turn before entering said outlet flange as it passes out of said apparatus.

6. The apparatus of claim 1 in which said element chamber is essentially fully filled with an absorbent attractor element having vertical upwardly positioned channels therein, said element consisting of a multiple number of concentric strips of said absorbent material such as corrugated paperboard, said strips extending from the floor of said apparatus to the lid thereof, said baffles being separated at the lower portion thereof by fully circular and concentric sections of absorbent material such as vertically positioned corrugated paperboard, said absorbent attractors having cutaway areas above said honeycomb section on opposite sides thereof, said cutaways so deposed as to facilitate the entrance and exit of an air stream, said cutaways to coincide with the opposing ports in the walls of said element chamber, said honeycomb section of said element being filled with oil, and being positioned in the lower sump section of said element chamber, this formulation then constituting at the upper portion of said baffles above the honeycomb, a number of crescent shaped channels on each side of said chamber through which air may flow through the port from the intake channels and on through the opposite port into the turbulance chamber, said element also having its lower portion positioned in the oil filled sump of the apparatus.

7. The apparatus of claim 6 in which said corrugated paper attractor element strips are vertically crimped into larger convolutions so deposed as to create turbulance in the air flow as it passes therethrough.

8. An Air Rectifier for the removal of both micronic and sub-micronic solid contaminants, such as dirt, mud, hail and snow, as well as liquid contaminants such as rain, oil and water from an air stream flowing therethrough, said apparatus comprising;

a unitary essentially circular body structure composed of solid non-porous material such as sheet metal, having a removable lid, said unitary body structure also having a floor with upwardly positioned vertical wall structures solidly articulated thereon, said wall structures extending upwardly to the lid of said apparatus so positioned and deposed as to form between said floor and said lid three distinct essentially concentric bottomly liquid tight operational divisions in said apparatus;

the outermost division, the intake channels, being essentially horseshoe shaped and being positioned on the two lateral sides and the rear of the next inwardly positioned division, and being fully opened on the forward ends thereof, said outer division containing a multiple number of narrow crescent shaped inlet channels, these channels formed by bottomly articulated vertical walls which extend upwardly to the lid, spaced within said intake channel, said narrow inlet channels having fully opened forward ends thereon and a multiple number of side-wall baffles with at least one bottomly positioned escape port at each baffle in each of said inlet channels, said channels converging together from each side at the rear of said apparatus, said channels also having escape ports in the floors thereof at the points of convergence, said channels also having at the points of convergence, air flow wall ports in the upper portion of the inner wall thereof, the outermost port opening into the second inwardly positioned channel, the second inner wall port opening into the next inner channel and finally the last inner wall port opening into the second major division of the apparatus, the element chamber, said element chamber being doughnut shaped and having fully circular side walls, the lower portion of said walls being liquid tight thus forming a sump portion therein, said chamber being fully filled with an upwardly channelled element, said element consisting of absorbent material such as corrugated paperboard or the like, said element being formed of a multiple number of concentric full height strips or baffles of said paperboard, said baffles being separated at the lower portion thereof by fully concentric sections of honeycomb-like material such as vertically positioned corrugated paperboard, said honeycomb section of said element being filled with oil or the like and being confined to the sump section of said element chamber, this formulation then consisting at the upper portion of said corrugated baffles above the honeycomb of narrow crescent shaped channels, the corrugated side walls of said channels having two cutaway sections at least part way down from the top thereof, one at the intake channel port, and the other at the exact opposite side at the port entering the turbulance chamber, said cutaway sections to facilitate the air flow from the intake channels, through the element channels, into the next inwardly positioned portion of the apparatus, the turbulance chamber, through an upwardly positioned port in the inner side wall of said element chamber;

said turbulance chamber being positioned immediately inward from said element chamber having a common wall therewith, said wall having an upwardly positioned port therethrough, said chamber being doughnut shaped, and having at the center of the floor thereof an outlet port, said outlet port having a tubular flange articulated therethrough;

said flange extending downwardly from the floor of said chamber to provide articulation to the motor intake and upwardly the full height of said chamber to the lid of said apparatus; said tubular flange having an upwardly positioned exit port on the side opposite the inlet port from the element chamber through which port and flange the air stream may pass from the apparatus into the motor after it has passed on both sides of said tubular flange and met head on in a reverse flow at the rear of the turbulance chamber and the tubular flange.

9. An Air Rectifying Process which in conjunction with an appropriate apparatus rectifies air by removing both micronic and sub-micronic solid contaminants, some of which are ionized, as well as liquid contaminants from an air stream passing through said apparatus, which air at great speed and in over supply under forced motion from the motor fan and the forward movement of the vehicle enters a multiple number of curved inlet channels which are integral with and positioned on opposing sides of said apparatus and passes therethrough, wherein heavy contaminants including water or snow are forced outwardly by centrifugal and inertial forces to the outer walls of said curved channels, where some cohere to said walls by cohesion or electrostatic attraction and where some move along said walls and finally pass behind outer side-wall baffles and on out of said apparatus with a small amount of air through escape ports behind said baffles in the floor of said channels, the cleaner remaining air then collids head-on from opposing sides of said apparatus with great turbulance and inertial force as it makes an abrupt turn to enter the inwardly positioned oil soaked and corrugated walled channels which are positioned in an element chamber in said apparatus, said air at said turn, by strong inertial forces dispells additional contaminants which are also purged with a small amount of air through exit ports in the floor of said apparatus, said remaining air then passes through said curved narrow oil soaked, vertically corrugated walled channels in the said element chamber during which passage said remaining contaminants, either dry or wet, micronic or sub-micronic are forced outwardly by centrifugal force to contact said oil soaked walls to be surface cohered or electrostatically attracted to said walls, this latter by virtue of natural ionization, also as the air flows through said corrugated walled channels, where severe aerodynamic turbulence occurs in said air stream due to the curvature of the channels and the convolutions of the corrugations in the wall thereof, severe eddying is created in the air as it whirls about said convolutions where small patterns of centrifugal forces thrust said contaminants against or very near said oiled walls causing them to cohere or be electrostatically attracted thereto, here said captured contaminants are then sheltered from the force of the main stream of the air flow as they are held by oil bonding in the valleys of the convolutions where they have sufficient dwell time to settle downwardly by gravitation into the bottomly positioned honeycomb oil filled sump of the apparatus, said air streams, at the end of said channels, again meet head-on from opposing sides and are radically reversed again dispelling contaminants by centrifugal and inertial forces into the sump area where said contaminants are held by an oil coating on the honeycomb, said air stream then enters a turbulance chamber where it divides and passes about a baffle at the throat of the outlet on both sides thereof thus coming head-on again with great turbulance in the turbulance chamber where as before inertial forces cast out heavy contaminants, before the air stream is again radically reversed, thus again dispelling contaminants including any air-borne droplets of oil or water to the oil coated floor of said chamber before entering the exit port and flange passing out of the apparatus, thus by the processes of centrifugal force with purging, inertial force with purging, aerodynamic turbulence and eddying with surface cohesion, oil bonding, electrostatic attraction and gravitational sedimentation essentially all contaminants are removed from said air stream.

* * * * *